(12) United States Patent
Zhu et al.

(10) Patent No.: US 10,678,086 B2
(45) Date of Patent: Jun. 9, 2020

(54) DISPLAY PANEL, DISPLAY DEVICE, AND DRIVING METHOD

(71) Applicant: BOE TECHNOLOGY GROUP CO., LTD., Beijing (CN)

(72) Inventors: Jinye Zhu, Beijing (CN); Wenqing Zhao, Beijing (CN); Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 33 days.

(21) Appl. No.: 16/064,637

(22) PCT Filed: Dec. 15, 2017

(86) PCT No.: PCT/CN2017/116647
§ 371 (c)(1),
(2) Date: Jun. 21, 2018

(87) PCT Pub. No.: WO2018/171270
PCT Pub. Date: Sep. 27, 2018

(65) Prior Publication Data
US 2019/0278129 A1 Sep. 12, 2019

(30) Foreign Application Priority Data

Mar. 23, 2017 (CN) .......................... 2017 1 0178391

(51) Int. Cl.
*G02F 1/1335* (2006.01)
*G02F 1/133* (2006.01)
(Continued)

(52) U.S. Cl.
CPC ......... *G02F 1/133512* (2013.01); *G02B 3/12* (2013.01); *G02F 1/13306* (2013.01); *G02F 1/133526* (2013.01); *G02F 1/19* (2013.01)

(58) Field of Classification Search
None
See application file for complete search history.

(56) References Cited

U.S. PATENT DOCUMENTS 5,159,478 A * 10/1992 Akiyama .......... G02F 1/133504
349/106
5,622,417 A 4/1997 Conner et al.
(Continued)

FOREIGN PATENT DOCUMENTS

CN 105589256 A 5/2016
CN 106526942 A 3/2017
(Continued)

OTHER PUBLICATIONS

Translation of CN106526942 (Year: 2019).*
International Search Report dated Mar. 15, 2018.

*Primary Examiner* — Phu Vu
(74) *Attorney, Agent, or Firm* — Dilworth & Barrese, LLP.; Michael J. Musella, Esq.

(57) ABSTRACT

A display panel includes a first substrate, a second substrate, and a liquid crystal layer disposed between the first substrate and the second substrate, and further comprises: a first black matrix disposed on a side of the first substrate adjacent to the liquid crystal layer; a second black matrix disposed on a side of the second substrate away from the liquid crystal layer, a sum of an orthogonal projection of the second black matrix on the first substrate and an orthogonal projection of the first black matrix on the first substrate completely covers the first substrate; an optical device at least partially located in the liquid crystal layer and located in a hollow region of the first black matrix, the optical device configured to refract incident light when voltages are applied across the liquid crystal layer, and have the refracted light emitted from a gap between adjacent second black matrixes.

15 Claims, 6 Drawing Sheets

(51) Int. Cl.
*G02B 3/12* (2006.01)
*G02F 1/19* (2019.01)

(56) References Cited

U.S. PATENT DOCUMENTS

| | | | | |
|---|---|---|---|---|
| 6,654,449 | B1 * | 11/2003 | Greene | G02F 1/133524 349/67 |
| 2018/0088438 | A1 | 3/2018 | Wang et al. | |

FOREIGN PATENT DOCUMENTS

| | | |
|---|---|---|
| CN | 106526993 A | 3/2017 |
| CN | 106707608 A | 5/2017 |

\* cited by examiner

DISPLAY PANEL, DISPLAY DEVICE, AND DRIVING METHOD

TECHNICAL FIELD

At least one embodiment of the present disclosure relates to a display panel, a display device and a driving method.

BACKGROUND

The current Liquid Crystal Display (LCD) comprises a backlight source, an array substrate, and a color filter substrate. A liquid crystal layer is disposed between the array substrate and the color filter substrate. An array of thin film transistors is disposed on the array substrate, and each of the thin film transistors corresponds to one sub-pixel. A color filter of a corresponding color is disposed in a position on the color filter substrate corresponding to the sub-pixel. By controlling signals and voltages of the respective thin film transistors, the rotation direction of the liquid crystal molecules is controlled so as to control emission of polarized light at each pixel, thereby attaining a display purpose. A polarizer is disposed on the outside of the array substrate and the color filter substrate, respectively, and polarization directions of the two polarizers are perpendicular to each other. Generally, after passing through one polarizer, light energy will be lost by about 40%. In the existing LCD, the light emitted from the backlight source should pass through two polarizers on the display panel and the light energy loss will be more than 80%, and the utilization of light energy is low.

At present, the light utilization efficiency and luminous efficiency are enhanced by forming an ordinary liquid crystal lens through the liquid crystal molecules and controlling a deflection of the liquid crystal molecules to change the light emitting direction. However, when using the liquid crystal molecules to form the liquid crystal lens, a certain thickness of the liquid crystal layer has to be ensured. Thus, the thickness of the liquid crystal cell is relatively great, which is conflict with the current trend for the display panel being light and thin.

SUMMARY

At least one embodiment of the present disclosure provides a display panel, comprising a first substrate, a second substrate, and a liquid crystal layer disposed between the first substrate and the second substrate, wherein the display panel further comprises: a first black matrix disposed on a side of the first substrate adjacent to the liquid crystal layer; a second black matrix disposed on a side of the second substrate away from the liquid crystal layer, a sum of an orthogonal projection of the second black matrix on the first substrate and an orthogonal projection of the first black matrix on the first substrate completely covers the first substrate; the display panel further comprises an optical device which is at least partially located in the liquid crystal layer and is located in a hollow region of the first black matrix, and the optical device is configured to refract incident light when there is a voltage difference across the liquid crystal layer, and have the refracted light emitted from a gap between adjacent second black matrixes.

In one embodiment of the present disclosure, the optical device is further configured such that light incident on the hollow region of the first black matrix is blocked by the second black matrix when the voltage difference across the liquid crystal layer is zero.

In one embodiment of the present disclosure, the first black matrix is in a grid shape, the hollow region of the first black matrix is rectangular or circular and is distributed in array, and the second black matrix is disposed to correspond to the hollow region of the first black matrix and has a same shape as the hollow region of the first black matrix.

In one embodiment of the present disclosure, the display panel further comprises a third black matrix provided on the side of the second substrate away from the liquid crystal layer, wherein there is a gap between an orthogonal projection of the third black matrix on the first substrate and the orthogonal projection of the second black matrix on the first substrate; wherein the optical device is configured to refract the incident light when there is a voltage difference across the liquid crystal layer, and have the refracted light emitted from a gap between the second black matrix and the third black matrix which are adjacent to each other.

In one embodiment of the present disclosure, the third black matrix is in a grid shape, when the hollow region of the first black matrix is rectangular, a hollow region of the third black matrix has a rectangular shape, or when the hollow region of the first black matrix is circular, a hollow region of the third black matrix has a ring shape, and the third black matrix and the second black matrix are disposed concentrically.

In one embodiment of the present disclosure, the optical device is a liquid crystal Fresnel lens; the display panel further comprises a first electrode and a second electrode, the first electrode and the second electrode are disposed on different sides of the liquid crystal layer and are configured to apply voltages across the liquid crystal layer so as to drive liquid crystal molecules in the liquid crystal layer to form the liquid crystal Fresnel lens.

In one embodiment of the present disclosure, the optical device comprises a solid-state Fresnel lens and a liquid crystal lens, the solid-state Fresnel lens is disposed on the first substrate and is configured to refract the light incident on the display panel and make the refracted light incident on the liquid crystal lens; the display panel further comprises a first electrode and a second electrode, the first electrode and the second electrode are disposed on different sides of the liquid crystal layer and are configured to apply voltages across the liquid crystal layer so as to drive liquid crystal molecules in the liquid crystal layer to form the liquid crystal lens, the liquid crystal lens is configured to refract the light refracted by the solid-state Fresnel lens and have the refracted light emitted from a gap between the second black matrix and the third black matrix adjacent to the second black matrix.

In one embodiment of the present disclosure, the solid-state Fresnel lens is disposed on a light emitting side or a light incident side of the first substrate.

In one embodiment of the present disclosure, the solid-state Fresnel lens is formed by nano-imprinting or photolithography.

At least one embodiment of the present disclosure further provides a display device comprising a display panel as described above.

At least one embodiment of the present disclosure further provides a driving method which is suitable to drive the display panel, the method comprising: applying different voltages to the two sides of the liquid crystal layer, so that the optical device refracts the light incident on the display panel and has the refracted light emitted from the gap between the adjacent second black matrixes.

In one embodiment of the present disclosure, the method further comprises applying voltages to the two sides of the liquid crystal layer, so that the optical device refracts the light incident on the display panel and has the refracted incident light emitted from the gap between the second black matrix and the third black matrix which are adjacent to each other.

In one embodiment of the present disclosure, the optical device is a liquid crystal Fresnel lens, and applying different voltages to the two sides of the liquid crystal layer comprises: applying voltages having a voltage difference of less than 20 v to the two sides of the liquid crystal layer, so as to drive the liquid crystal molecules in the liquid crystal layer to form the liquid crystal Fresnel lens.

In one embodiment of the present disclosure, the optical device comprises a solid-state Fresnel lens and a liquid crystal lens, and applying voltages to the two sides of the liquid crystal layer comprises: applying voltages having a voltage difference of less than 10 v to the two sides of the liquid crystal layer, so as to drive the liquid crystal molecules in the liquid crystal layer to form the liquid crystal lens.

In one embodiment of the present disclosure, the method further comprises applying no voltage to the two sides of the liquid crystal layer, or applying the same voltages to the two sides of the liquid crystal layer, so that the light passing through the hollow region of the first black matrix is blocked by the second black matrix.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

FIG. 4a-1 to FIG. 4a-3 are structural illustrative views of the respective black matrixes as illustrated in FIG. 3a.

REFERENCE NUMERALS

Figure 1A:
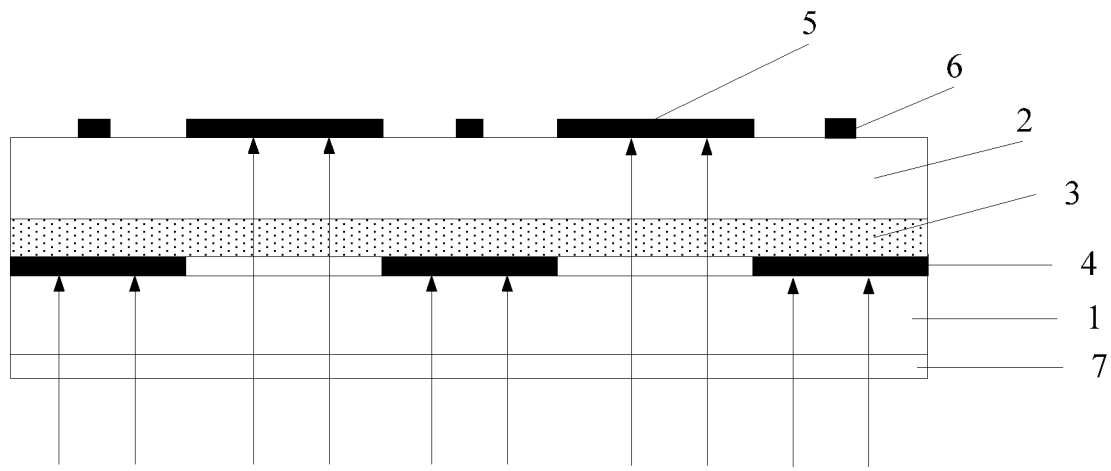
FIG. 1a is an illustrative view of an optical path of a display panel according to Embodiment 1 of the present disclosure at the time of L0.

1. First substrate
2. Second substrate
3. Liquid crystal layer
4. First black matrix
5. Second black matrix
6. Third black matrix
7. Polarizer
8. Liquid crystal Fresnel lens
9. Solid-state Fresnel lens
10. Liquid crystal lens

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiment 1

Figure 1B:
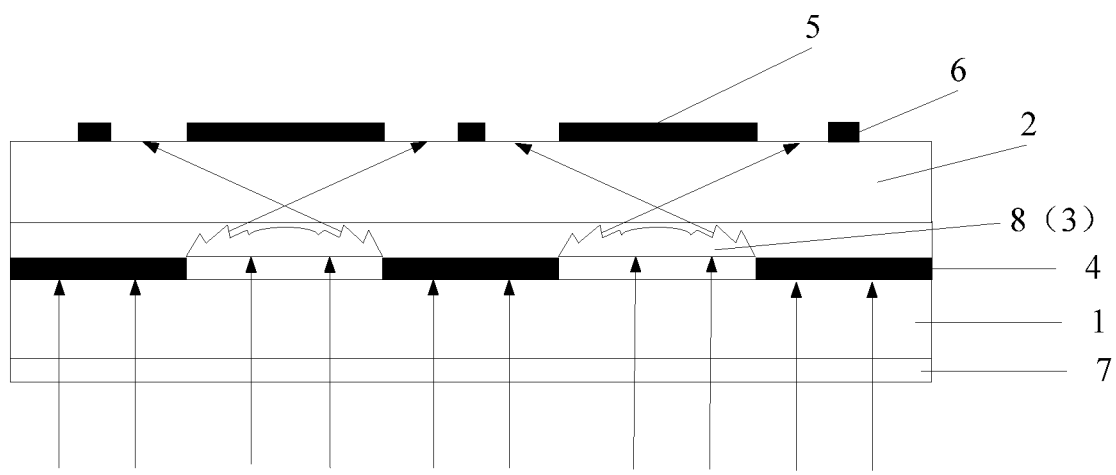
FIG. 1b is an illustrative view of an optical path of a display panel according to Embodiment 1 of the present disclosure at the time of L255.

FIG. 1a and FIG. 1b illustrate a display panel according to the Embodiment 1 of the present disclosure. FIG. 1a is an illustrative view of an optical path when the display panel provided by Embodiment 1 is at L0, that is, a voltage difference across the liquid crystal layer 3 is 0. FIG. 1b is an illustrative view of an optical path when the display panel provided by Embodiment 1 displays a gray scale of 255.

The display panel comprises a first substrate 1, a second substrate 2, and a liquid crystal layer 3 disposed between the first substrate 1 and the second substrate 2. The first substrate 1 can be an array substrate, and the second substrate 2 can be a color filter substrate. A first black matrix 4 is disposed on a side of the first substrate 1 adjacent to the liquid crystal layer 3, namely, the first black matrix 4 is disposed on a light emitting side of the first substrate 1. A second black matrix 5 is disposed on a side of the second substrate 2 away from the liquid crystal layer 3, namely, the second black matrix 5 is disposed on a light emitting side of the second substrate 2. There is no gap between an orthogonal projection of the second black matrix 5 on the first substrate 1 and an orthogonal projection of the first black matrix 4 on the first substrate 1. That is to say, the second black matrix 5 and the first black matrix 4 are disposed at intervals, and a sum of the orthogonal projection of the second black matrix 5 on the first substrate 1 and the orthogonal projection of the first black matrix 4 on the first substrate 1 can completely cover the entire first substrate 1. The orthogonal projection of the second black matrix 5 on the first substrate 1 and the orthogonal projection of the first black matrix 4 on the first substrate 1 can be partially overlapped or may not be overlapped. In one embodiment of the present disclosure, in consideration that the orthogonal projection of the second black matrix 5 on the first substrate 1 and the orthogonal projection of the first black matrix 4 on the first substrate being partially overlapped would affect an aperture ratio of the display panel, the orthogonal projection of the second black matrix 5 on the first substrate 1 and the orthogonal projection of the first black matrix 4 on the first substrate are contiguous to each other, but are not overlapped with each other. As such, the sum of the orthographic projection of the second black matrix 5 on the first substrate 1 and the orthogonal projection of the first black matrix 4 on the first substrate 1 can completely cover the entire first substrate 1 exactly.

As illustrated in FIG. 1b, the display panel further comprises an optical device. The optical device is at least partially located in the liquid crystal layer 3 and is located in a hollow region (i.e., an opening region) formed by the first black matrix 4, and is configured to refract the incident light when there is a voltage difference across the liquid crystal layer 3, and then have the incident light being refracted emitted from a gap between the adjacent second black matrixes 5 of the second substrate 2. In other words, the optical device can change an exit angle of the refracted light according to a change of the voltage difference across the liquid crystal layer 3 so as to achieve a change of the gray scale of the display panel.

As illustrated in FIG. 1a and FIG. 1b, the display panel further comprises a polarizer 7. The polarizer 7 is located on a light incident side of the first substrate 1, and a wire grid polarizer (WGP) can be adopted.

In the embodiments of the present disclosure, by a configuration in which the first black matrix 4 is disposed on the light emitting side of the array substrate (i.e., the first substrate 1), the second black matrix 5 is disposed on the light emitting side of the color filter substrate (i.e., the second substrate 2), and the first black matrix 4 and the second black matrix 5 are disposed at intervals, and an optical device is provided at least partially located in the liquid crystal layer 3, when there is a voltage difference across the liquid crystal layer 3, the optical device can change the light transmission direction and increase the exit angle of the incident light, i.e., refract the incident light so that the refracted light is emitted from a gap between the adjacent second black matrixes 5 of the second substrate 2. In this way, by controlling the voltage difference across the liquid crystal layer 3, the change of gray scale of the display panel can be controlled (how to control the gray scale will be described hereinafter). On the one hand, no polarizer needs to be provided at the outside of the color filter substrate, thus thereby reducing the light energy loss and improving the utilization rate of light energy and luminous efficiency. On the other hand, the optical device can at least partially achieve an effect of a liquid crystal lens, which, compared with a solution completely relying on the liquid crystal lens to change the direction of light, reduces the thickness of the liquid crystal cell to a certain extent, and thus can take account of both the luminous efficiency and the thickness of the liquid crystal cell.

Further, as illustrated in FIG. 1a, the optical device is further configured such that the light incident on the hollow region formed by the first black matrix 4 is blocked by the second black matrix 5 when the voltage difference across the liquid crystal layer 3 is 0 (i.e., L0). That is to say, when no voltage or the same voltage are applied across the liquid crystal layer 3, the light refracted by the optical device is incident on the second substrate 2 and is completely blocked by the second black matrix 5. At this time, the display panel is in a completely black state.

Since a region between two adjacent second black matrixes 5 covers two adjacent sub-pixel regions, in order to further prevent the crosstalk between the light emitted from the adjacent sub-pixels, in the embodiments of the present disclosure, a third black matrix can be further provided to make the adjacent sub-pixels spaced apart from each other.

As illustrated in FIG. 1a and FIG. 1b, a side of the second substrate 2 away from the liquid crystal layer 3 is further provided with a third black matrix 6, and the third black matrix 6 is disposed in a gap of the adjacent second black matrixes 5 and is not in contact with the second black matrixes 5. That is to say, there is a gap between an orthogonal projection of the third black matrix 6 on the first substrate 1 and the orthogonal projection of the second black matrix 5 on the first substrate 1. Since there is no gap between the orthogonal projection of the first black matrix 4 on the first substrate 1 and the orthogonal projection of the second black matrix 5 on the first substrate 1, the orthogonal projection of the third black matrix 6 on the first substrate 1 falls within the range of the orthogonal projection of the first black matrix 4 on the first substrate 1, namely, the orthogonal projection of the third black matrix 6 on the first substrate 1 totally coincides with a part of the orthogonal projection of the first black matrix 4 on the first substrate 1.

As illustrated in FIG. 1b, the optical device is further configured to refract the incident light when there is a voltage difference across the liquid crystal layer 3, so that the incident light after being refracted is emitted from a gap between the adjacent second black matrix 5 and third black matrix 6.

In case that no third black matrix 6 is provided, by accurately controlling the voltage difference across the liquid crystal layer 3 so as to accurately control the exit angle of the light emitted from the optical device, the crosstalk of light from adjacent sub-pixels can be avoided as well.

In the embodiments of the present disclosure, by providing the third black matrix 6 between adjacent second black matrixes 5 on the light emitting side of the second substrate 2, even if the voltages applied across the liquid crystal layer 3 are interfered so that the exit angle of light is increased, the light at the edges will be blocked by the third black matrix 6, which can still solve the problem of light crosstalk between adjacent sub-pixels and ensure a normal display, thereby improving the reliability and practicality of the display panel.

The structure and distribution of the first black matrix 4, the second black matrix 5, and the third black matrix 6 will be described in detail below with reference to FIG. 3a and FIG. 3b.

Figure 3A:
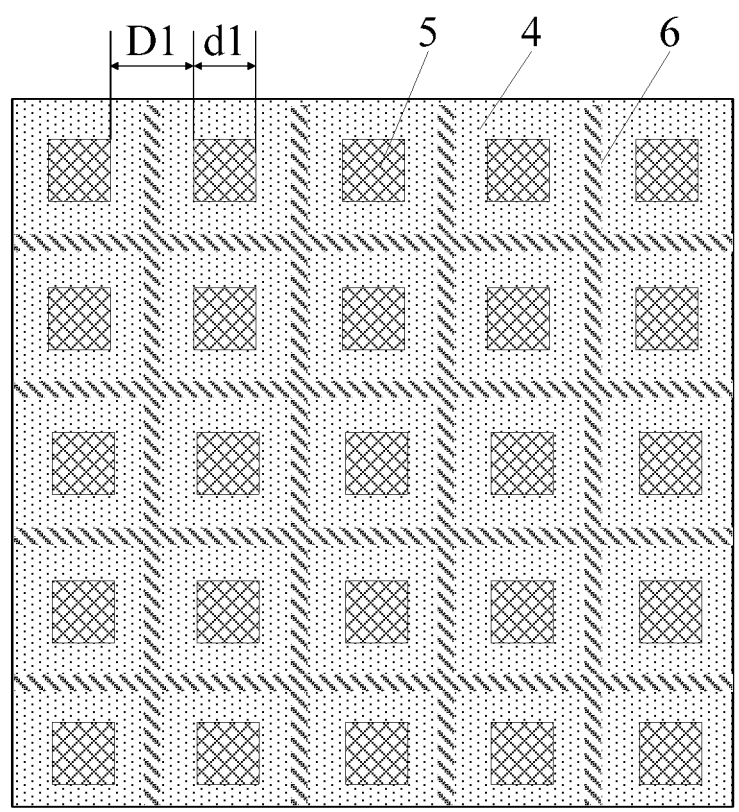
FIG. 3a is a first structural illustrative view of a black matrix according to Embodiments 1 and 2 of the present disclosure.

FIG. 3a illustrates a structure of the first black matrix 4, the second black matrix 5 and the third black matrix 6. As illustrated in FIG. 3a, the first black matrix 4 and the third black matrix 6 are both in a grid shape, and both a hollow region formed by the first black matrix 4 and a hollow region formed by the third black matrix 6 are rectangular. The second black matrix 5 is rectangular and is distributed in an array. The second black matrix 5 corresponds to the hollow region formed by the first black matrix 4.

In one embodiment according to the present disclosure, the distances from the third black matrix 6 to the adjacent second black matrixes 5 located on both sides of the third black matrix 6 are equal to each other. Thus, it can be ensured that the sub-pixels are equal in size and evenly distributed, thereby ensuring the display effect.

Since the region between two adjacent second black matrixes 5 corresponds to the sub-pixel region, in one embodiment according to the present disclosure, a width D1 of the first black matrix 4 (i.e., a distance between two adjacent hollow regions, and the distance also corresponds to a distance between two adjacent second black matrixes 5) is greater than a width d1 of the second black matrix 5. Thus, the aperture ratio of the display panel becomes larger.

Figures 1, 4A:
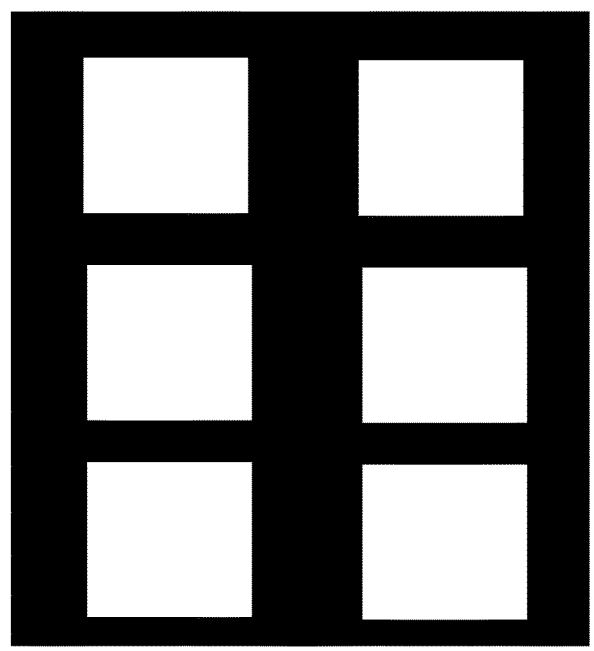
Figures 2, 4A:
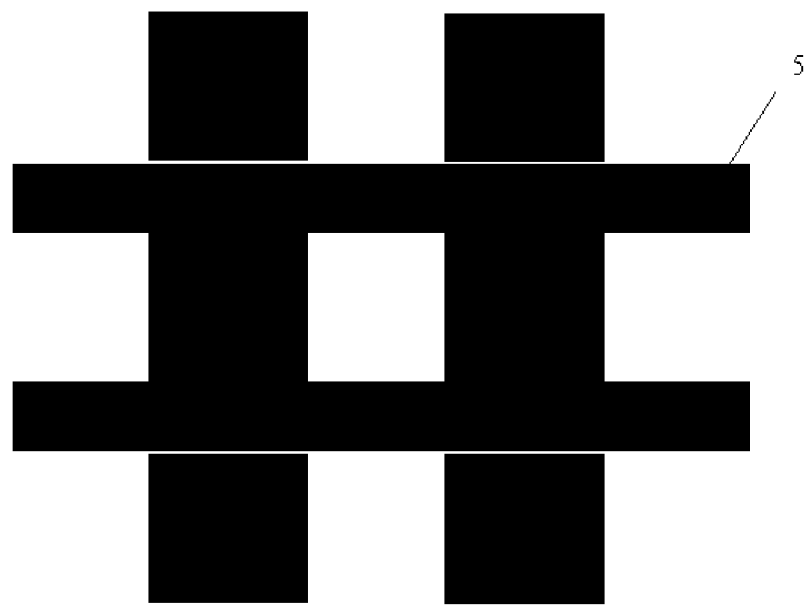
Figures 3, 4A:
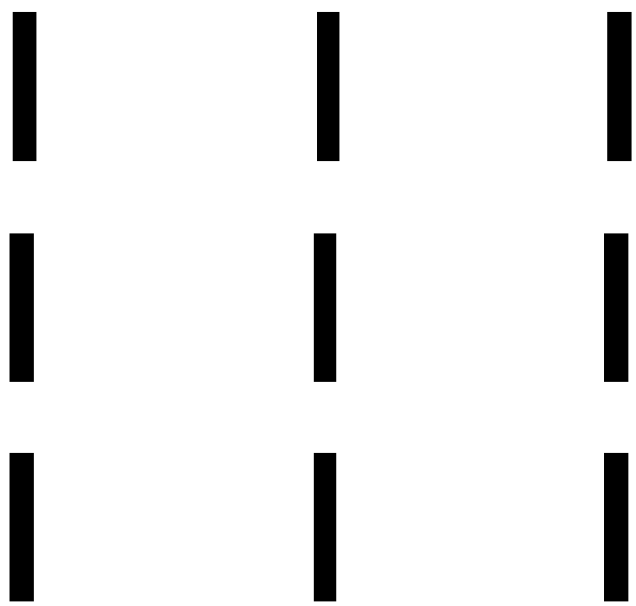

FIG. 4a-1 illustrates a top structural view of the first black matrix 4, FIG. 4a-2 illustrates a top structural view of the second black matrix 5, and FIG. 4a-3 illustrates a top structural view of the third black matrix 6.

Figure 3B:
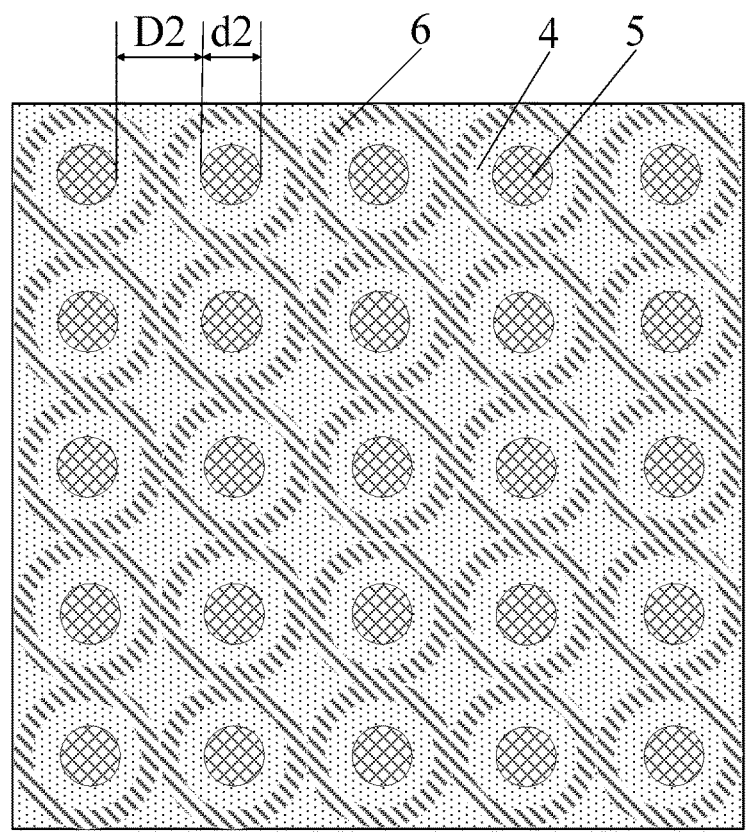
FIG. 3b is a second structural illustrative view of a black matrix according to Embodiments 1 and 2 of the present disclosure.

FIG. 3b illustrates another structure of the first black matrix 4, the second black matrix 5, and the third black matrix 6. As illustrated in FIG. 3b, a hollow region formed by the first black matrix 4 is circular. The second black matrix 5 has a circular block shape. The third black matrix 6 has a ring shape. Both the second black matrix 5 and the third black matrix 6 are distributed in an array.

In one embodiment of the present disclosure, the second black matrix 5 and the third black matrix 6 are concentrically arranged, and the adjacent third black matrixes 6 are tangent to each other. In this way, it can be ensured that the sub-pixels are equal in size and evenly distributed, thereby ensuring the display effect.

In one embodiment of the present disclosure, a distance D2 between two adjacent second black matrixes 5 is greater than a diameter d2 of the second black matrix 5. Thus, the display panel has a larger aperture ratio.

It should be noted that all the regions other than the circular hollow region of the first black matrix 4 on the first substrate 1 are covered by the first black matrix 4. In this case, the sub-pixel region is also circular, and the region between two adjacent second black matrixes 5 covers two sub-pixels.

In Embodiment 1 of the present disclosure, as illustrated in FIG. 1*b*, the optical device is a liquid crystal Fresnel lens 8. The display panel further comprises a first electrode and a second electrode. The difference between the voltages applied to the first electrode and the second electrode drives the liquid crystal molecules in the liquid crystal layer 3 to form the liquid crystal Fresnel lens 8.

Figure 1C:
FIG. 1c to FIG. 1f illustrate structural views of an electrode provided on a display panel according to an embodiment of the present disclosure.

FIG. 1*c* illustrates a structural view of the electrodes when the optical device is formed as a liquid crystal Fresnel lens. As illustrated in FIG. 1*c*, the display panel further comprises a first electrode 11 disposed on the first substrate 1 and a second electrode 12 disposed on the second substrate 2. The first electrode 11 is a double-layered electrode with an insulating layer 20 therebetween, and is disposed on a surface of the first substrate 11 facing toward the second substrate 2. The second electrode 12 is a planar electrode and is disposed on a surface of the second substrate 2 facing toward the first substrate 1.

Figure 1D:
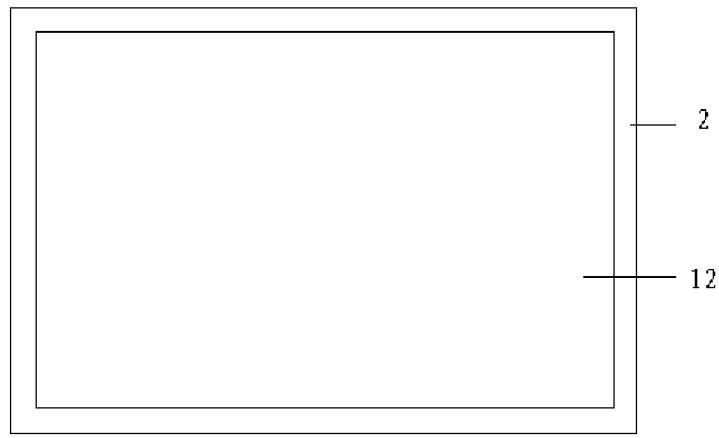

FIG. 1*d* illustrates a top view of the second substrate 2 on which the second electrode 12 is formed, wherein the second electrode 12 is formed as a planar electrode.

Figure 1E:
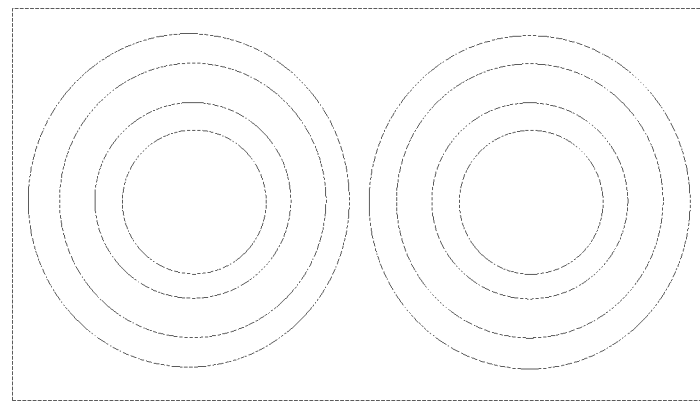

FIG. 1*e* illustrates a top view of the first substrate 1 on which the first electrodes 11 are formed, wherein the first electrodes 11 are formed in shape of concentric rings, each group of the concentric ring-like electrodes corresponds to one sub-pixel.

Figure 1F:
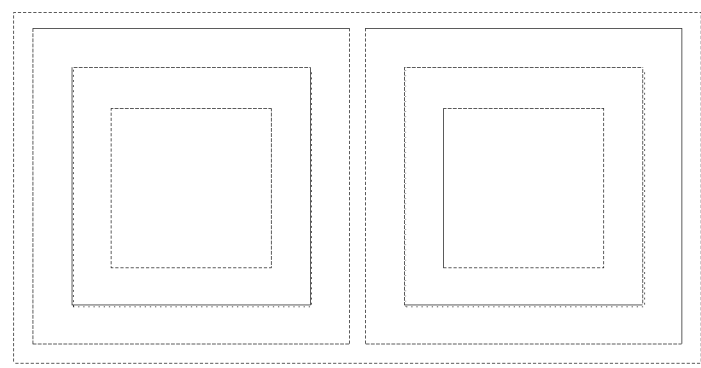

FIG. 1*f* illustrates a top view of the first substrate on which the first electrodes 11 are formed, wherein the first electrode 11 is formed as a double-layered square electrode and each group of the double-layered square electrodes corresponds to one sub-pixel.

By forming the first electrode, which is a double-layered electrode isolated by an insulating layer therebetween, on the first substrate, by having the width of the electrode made as small as possible, and by forming the planar electrode on the second substrate, the alignment direction of the liquid crystal molecules sandwiched between the first substrate and the second substrate can be set by applying a gradient voltage to the first electrode and forming a gradient electric field between the first electrode and the second electrode, thus forming a liquid crystal Fresnel lens. By applying different gradient voltages on the first electrode, the focal position of the Fresnel lens can be adjusted, and thus adjusting the direction of light after passing through the Fresnel lens, so as to make different light pass through the gap between the black matrixes to achieve different gray scales.

The first electrode and the second electrode can be a pixel electrode and a common electrode, respectively, and the positions of the first electrode and the second electrode are different from each other depending on the type of the driving electric field of the display panel, which will not be described in detail.

In one embodiment of the present disclosure, the difference between the voltages applied to the first electrode and the second electrode is less than 20 v.

The operation of the display panel according to Embodiment 1 will be described below with reference to FIG. 1*a* and FIG. 1*b*.

A collimated backlight (indicated by arrows in the figure) is incident on the light incident side of the first substrate 1. After being polarized by the polarizer 7, a part of the light is blocked by the first black matrix 4, while a part of the light is incident on the liquid crystal layer 3 from the gap between the adjacent two first black matrixes 4.

At the time of L0, as illustrated in FIG. 1*a*, when the voltage difference across the liquid crystal layer 3 is zero, i.e., no voltage is applied or the same voltage is applied, the liquid crystal molecules in the liquid crystal layer 3 do not form a liquid crystal Fresnel lens. The light does not change its direction when passing through the gap between two adjacent first black matrixes 4 and then is blocked by the second black matrix 5 on the color film substrate (i.e., the second substrate 2). The display panel is in a completely black state.

At the time of L255, as illustrated in FIG. 1*b*, different voltages are applied to the two sides of the liquid crystal layer 3 so that there is a voltage difference across the liquid crystal layer 3. The voltage difference can drive the liquid crystal molecules in the liquid crystal layer 3 to form a liquid crystal Fresnel lens 8. The light is refracted by the liquid crystal Fresnel lens 8 when passing through the gap between the adjacent two first black matrixes 4, is scattered at a maximum angle, and is emitted from a gap between the second black matrix 5 the Fresnel lens and the third black matrix 6 adjacent to the second black matrix 5, the second black matrix 5 and the third black matrix 6 disposed above the liquid crystal Fresnel lens. The display panel performs a display in the brightest state. It should be noted that the larger the voltage difference is, the greater the deflection angle of the liquid crystal molecules and the gray scale are. Therefore, by controlling the magnitude of the voltage difference, a focal length of the liquid crystal Fresnel lens 8 can be controlled, thereby controlling the angle of the scattered light and thus controlling the change of gray scale of the display panel.

According to the display panel provided in Embodiment 1 of the present disclosure, the gray scale control is realized simply by the voltage difference applied across the liquid crystal layer 3, which requires a high precision of the applied voltage, but can greatly reduce the thickness of the liquid crystal cell in comparison with the conventional technology.

Embodiment 2

Figure 2A:
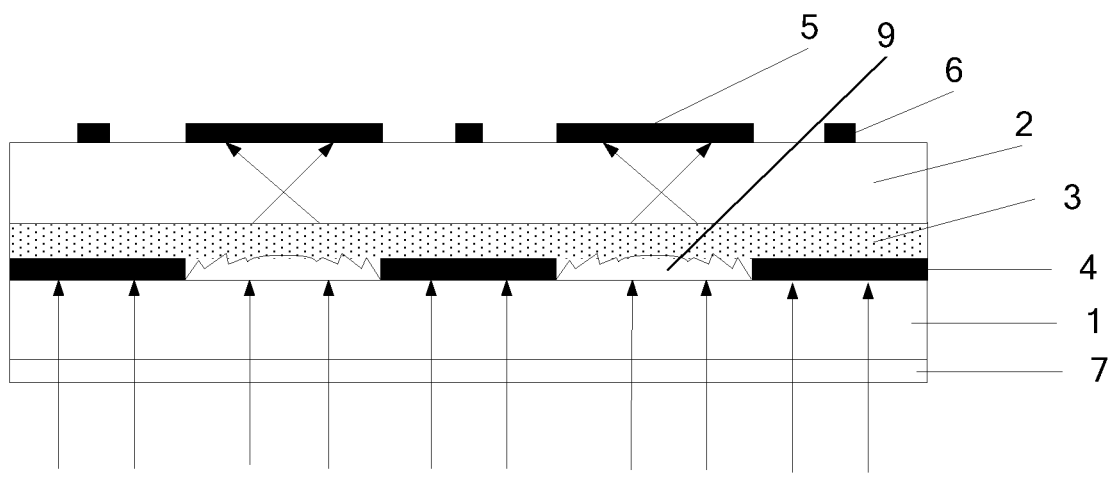
FIG. 2a is an illustrative view of a display panel according to Embodiment 2 of the present disclosure at the time of L0.
Figure 2B:
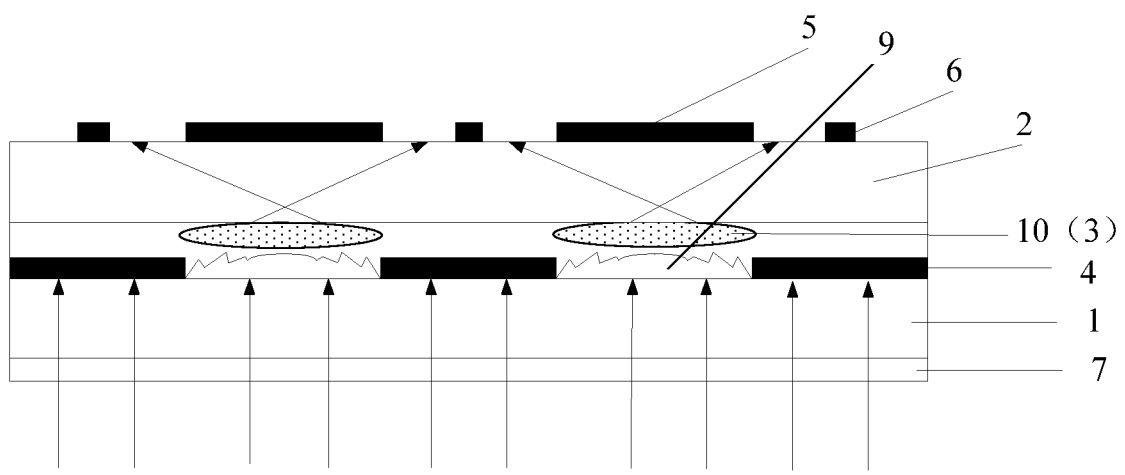
FIG. 2b is an illustrative view of a display panel according to Embodiment 2 of the present disclosure at the time of L255.

As illustrated in FIG. 2*a* and FIG. 2*b*, Embodiment 2 of the present disclosure provides a display panel. FIG. 2*a* is an illustrative view of a light path of the display panel according to Embodiment 2 at the time of L0; and FIG. 2*b* is an illustrative view of a light path of the display panel according to Embodiment 2 at the time of L255.

The difference between Embodiment 2 and Embodiment 1 lies in the difference in composition and structure of the optical device. The optical device in Embodiment 1 is a liquid crystal Fresnel lens, while the optical device in Embodiment 2 is a composite lens formed by a solid-state Fresnel lens and a liquid crystal lens. Other structures of the display panel according to Embodiment 2 are the same as those of the display panel according to Embodiment 1, and will not be repeated here.

The optical device of Embodiment 2 will be described in detail below with reference to FIG. 2a and FIG. 2b.

As illustrated in FIG. 2b, the optical device in Embodiment 2 comprises a solid-state Fresnel lens 9 and a liquid crystal lens 10. The solid-state Fresnel lens 9 is disposed on the first substrate 1 for refracting the light incident on the display panel and making the refracted light incident on the liquid crystal lens 10.

The display panel according to Embodiment 2 also comprises a first electrode (not shown in the figure) and a second electrode (not shown in the figure). The liquid crystal molecules in the liquid crystal layer 3 are driven by a difference in the voltages applied across the first electrode and the second electrode, such that a liquid crystal lens 10 is formed. The liquid crystal lens 10 is configured to refract the incident light refracted by the solid-state Fresnel lens 9, and have the refracted light emitted from the gap between the adjacent second black matrix 5 and third black matrix 6. That is to say, the light which is not blocked by the first black matrix 4 is refracted by the solid-state Fresnel lens 9 at first, and then is refracted by the liquid crystal lens 10, and finally is emitted from the second substrate 2 between the adjacent second black matrix 5 and third black matrix 6.

In one embodiment of the present disclosure, the voltage difference applied across the first electrode and the second electrode is less than 10 v.

As illustrated in FIG. 2a and FIG. 2b, in Embodiment 2, the solid-state Fresnel lens 9 is located inside the liquid crystal cell, namely, is located on the light emitting side of the first substrate 1. It should be noted that the solid-state Fresnel lens 9 can also be disposed on the light incident side of the first substrate 1 and positioned between the first substrate 1 and the polarizer 7. The solid-state Fresnel lens 9 can be formed by nano-imprinting or photolithography.

The operation of the display panel according to Embodiment 2 will be described below with reference to FIG. 2a and FIG. 2b.

The collimated backlight (indicated by arrows in the figure) is incident at the light incident side of the first substrate 1 after being polarized by the polarizer 7. A part of the light is blocked by the first black matrix 4, while a part of the light is incident on the solid-state Fresnel lens 9 from the gap between the adjacent two first black matrixes 4.

As illustrated in FIG. 2a, when there is no voltage difference across the liquid crystal layer 3, that is, no voltage is applied or the same voltage is applied, the liquid crystal molecules in the liquid crystal layer 3 do not form a liquid crystal lens. The light is incident on the solid-state Fresnel lens 9 from the gap between adjacent first black matrixes 4. The light is scattered by the solid-state Fresnel lens 9 at a small angle, and is blocked by the second black matrix 5 on the color film substrate (i.e., the second substrate 2). The display panel is in a completely black state.

As illustrated in FIG. 2b, different voltages are applied to the two sides of the liquid crystal layer 3 so that there is a voltage difference across the liquid crystal layer 3. The voltage difference can drive the liquid crystal molecules in the liquid crystal layer 3 to form a liquid crystal lens 10. The light passes through the gap between the adjacent two first black matrixes 4 and then exits from the liquid crystal lens at a maximum angle by an action of the composite lens formed by the solid-state Fresnel lens 9 and the liquid crystal lens 10, and is emitted from the gap between the adjacent second black matrix 5 and third black matrix 6. The display panel performs a display in the brightest state. It should be noted that the larger the voltage difference is, the greater the deflection angle of the liquid crystal molecules and the gray scale are. Therefore, by controlling the magnitude of the voltage difference, a focal length of the liquid crystal lens 10 can be controlled, thereby controlling the exit angle of the light and thus controlling the display gray scale of the display panel.

In the display panel according to Embodiment 2 of the present disclosure, by a collective action of the solid-state Fresnel lens 9 and the liquid crystal lens 10, the light can be emitted at a relatively large angle. Therefore, the process of driving the liquid crystal molecules to deflect through the voltage difference is made simpler and easier to implement.

In the display panels according to Embodiment 1 and Embodiment 2 of the present disclosure, since the upper polarizer on the color film substrate is saved which improves the transmittance, the natural light can be used as the backlight, and thus the backlight module is saved accordingly, thereby realizing a transparent display.

Embodiment 3

Embodiment 3 of the present disclosure provides a display device comprising the display panel described in Embodiment 1 or 2.

By providing the first black matrix 4 on the light emitting side of the array substrate (i.e., the first substrate 1), and providing the second black matrix 5 on the light emitting side of the color filter substrate (i.e., the second substrate 2), the first black matrix 4 and the second black matrix 5 are disposed alternately, and the orthogonal projection of the second black matrix 5 on the array substrate is contiguous to but not overlapped with the orthogonal projection of the first black matrix 4 on the array substrate. By providing an optical device at least partially located in the liquid crystal layer 3, the optical device can change the exit direction of the emitted light, and expand the exit angle of the incident light, that is, refract the incident light, and have the refracted incident light emitted from the gap between adjacent second black matrix 5, when there is a voltage difference across the liquid crystal layer 3. In this way, the display gray scale of the display device can be controlled by controlling the voltage difference across the liquid crystal layer 3. On the one hand, there is no need to provide a polarizer on the outer side of the color film substrate, thereby reducing the loss of light energy and improving both the utilization of light energy and luminous efficiency. On the other hand, the optical device can at least partially achieve the effect of a liquid crystal lens, and in comparison with a solution to change the light exiting direction by completely relying on the liquid crystal lens, the thickness of the liquid crystal cell is reduced to a certain extent, thus taking account of both the luminous efficiency and the thickness of the liquid crystal cell.

Embodiment 4

Embodiment 4 of the present disclosure provides a driving method which is operated to drive the display panel described in Embodiments 1 and 2. The method comprises the following step:

applying different voltages to the two sides of the liquid crystal layer 3, so that the optical device refracts the light incident on the display panel and has the refracted light emitted from the second substrate 2 at the gap between the adjacent second black matrixes 5, as illustrated in FIG. 1b and FIG. 2b.

Further, the method can further comprise the following step:

applying voltages to the liquid crystal layer 3, so that the optical device refracts the light incident on the display panel and has the refracted incident light emitted from the gap between the adjacent second black matrix 5 and the third black matrix 6 on the second substrate 2.

As illustrated in FIG. 1b, when the optical device is a liquid crystal Fresnel lens 8, applying voltages to the liquid crystal layer comprises applying voltages having a voltage difference of less than 20 v to the two sides of the liquid crystal layer 3, so as to drive the liquid crystal molecules in the liquid crystal layer to form the liquid crystal Fresnel lens 8.

As illustrated in FIG. 2b, when the optical device comprises a solid-state Fresnel lens 9 and a liquid crystal lens 10, applying voltages to the liquid crystal layer 3 comprises applying voltages having a voltage difference of less than 10 v to the two sides of the liquid crystal layer 3, so as to drive the liquid crystal molecules in the liquid crystal layer 3 to form the liquid crystal lens 10.

In one embodiment of the present disclosure, the method further comprises the following step:

As illustrated in FIG. 1a and FIG. 2a, stopping applying voltages to the liquid crystal layer 3, so that the light passing through the hollow region of the first black matrix 4 is blocked by the second black matrix 5.

In the display panel, the display device, and the driving method according to the present disclosure, a liquid crystal Fresnel lens or a liquid crystal lens is formed by the liquid crystals, the light path is controlled by changing the voltages to control the shape of the liquid crystal Fresnel lens, or the light path is controlled under a collective action of the liquid crystal lens and the solid-state Fresnel lens by changing the voltages to control the shape of the liquid crystal lens, thereby displaying different gray scales, eliminating an upper polarizer, improving the utilization of light energy, reducing the thickness of the liquid crystal cell, reducing the difficulty of the processes and improving the yield.

The foregoing are merely exemplary embodiments of the disclosure, but the scope of protection of the present disclosure is not limited thereto. The protection scope of the disclosure shall be defined by the attached claims.

The present disclosure claims priority of Chinese Patent Application No. 201710178391.X filed on Mar. 23, 2017, the disclosure of which is hereby entirely incorporated by reference as a part of the present disclosure.

The invention claimed is:

1. A display panel, comprising a first substrate, a second substrate, and a liquid crystal layer disposed between the first substrate and the second substrate, wherein the display panel further comprises:
  a first black matrix disposed on a side of the first substrate adjacent to the liquid crystal layer;
  a second black matrix disposed on a side of the second substrate away from the liquid crystal layer, a sum of an orthogonal projection of the second black matrix on the first substrate and an orthogonal projection of the first black matrix on the first substrate completely covers the first substrate;
  the display panel further comprises an optical device which is at least partially located in the liquid crystal layer and is located in a hollow region of the first black matrix, and the optical device is configured to refract incident light when there is a voltage difference across the liquid crystal layer, and have the refracted light emitted from a gap between adjacent second black matrixes.

2. The display panel according to claim 1, wherein the optical device is further configured such that light incident on the hollow region of the first black matrix is blocked by the second black matrix when the voltage difference across the liquid crystal layer is zero.

3. The display panel according to claim 1, wherein the first black matrix is in a grid shape, the hollow region of the first black matrix is rectangular or circular and is distributed in array, and the second black matrix is disposed to correspond to the hollow region of the first black matrix and has a same shape as the hollow region of the first black matrix.

4. The display panel according to claim 3, further comprising a third black matrix provided on the side of the second substrate away from the liquid crystal layer, wherein there is a gap between an orthogonal projection of the third black matrix on the first substrate and the orthogonal projection of the second black matrix on the first substrate;
  wherein the optical device is configured to refract the incident light when there is a voltage difference across the liquid crystal layer, and have the refracted light emitted from a gap between the second black matrix and the third black matrix which are adjacent to each other.

5. The display panel according to claim 4, wherein the third black matrix is in a grid shape, when the hollow region of the first black matrix is rectangular, a hollow region of the third black matrix has a rectangular shape, or when the hollow region of the first black matrix is circular, a hollow region of the third black matrix has a ring shape, and the third black matrix and the second black matrix are disposed concentrically.

6. The display panel according to claim 1, wherein the optical device is a liquid crystal Fresnel lens;
  the display panel further comprises a first electrode and a second electrode, the first electrode and the second electrode are disposed on different sides of the liquid crystal layer and are configured to apply voltages across the liquid crystal layer so as to drive liquid crystal molecules in the liquid crystal layer to form the liquid crystal Fresnel lens.

7. The display panel according to claim 1, wherein the optical device comprises a solid-state Fresnel lens and a liquid crystal lens, the solid-state Fresnel lens is disposed on the first substrate and is configured to refract the light incident on the display panel and make the refracted light incident on the liquid crystal lens;
  the display panel further comprises a first electrode and a second electrode, the first electrode and the second electrode are disposed on different sides of the liquid crystal layer and are configured to apply voltages across the liquid crystal layer so as to drive liquid crystal molecules in the liquid crystal layer to form the liquid crystal lens, the liquid crystal lens is configured to refract the light refracted by the solid-state Fresnel lens and have the refracted light emitted from a gap between the second black matrix and the third black matrix adjacent to the second black matrix.

8. The display panel according to claim 7, wherein the solid-state Fresnel lens is disposed on a light emitting side or a light incident side of the first substrate.

9. The display panel according to claim 7, wherein the solid-state Fresnel lens is formed by nano-imprinting or photolithography.

10. A display device, comprising the display panel according to claim 1.

11. A driving method, which is operable to drive the display panel according to claim 1, comprising:
applying different voltages to the two sides of the liquid crystal layer, so that the optical device refracts the light incident on the display panel and has the refracted light emitted from the gap between the adjacent second black matrixes.

12. The driving method according to claim 11, further comprising:
applying voltages to the two sides of the liquid crystal layer, so that the optical device refracts the light incident on the display panel and has the refracted incident light emitted from the gap between the second black matrix and the third black matrix which are adjacent to each other.

13. The driving method according to claim 11, wherein the optical device is a liquid crystal Fresnel lens, and applying different voltages to the two sides of the liquid crystal layer comprises:
applying voltages having a voltage difference of less than 20 v to the two sides of the liquid crystal layer, so as to drive the liquid crystal molecules in the liquid crystal layer to form the liquid crystal Fresnel lens.

14. The driving method according to claim 11, wherein the optical device comprises a solid-state Fresnel lens and a liquid crystal lens, and applying voltages to the two sides of the liquid crystal layer comprises:
applying voltages having a voltage difference of less than 10 v to the two sides of the liquid crystal layer, so as to drive the liquid crystal molecules in the liquid crystal layer to form the liquid crystal lens.

15. The driving method according to claim 11, further comprising:
applying no voltage to the two sides of the liquid crystal layer, or applying the same voltages to the two sides of the liquid crystal layer, so that the light passing through the hollow region of the first black matrix is blocked by the second black matrix.

* * * * *